Patented June 5, 1934

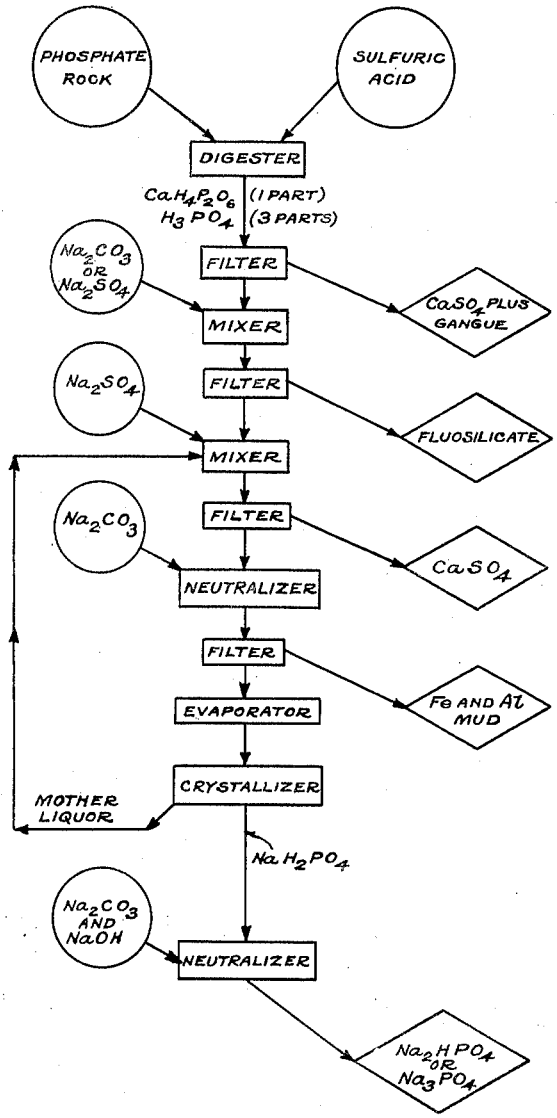

1,961,127

UNITED STATES PATENT OFFICE 1,961,127

MAKING DISODIUM PHOSPHATE

John Harry Coleman, Elizabeth, N. J., assignor to The Warner Chemical Company, New York, N. Y., a corporation of New Jersey Application August 9, 1932, Serial No. 628,112

18 Claims. (Cl. 23—107)

This invention relates to making disodium phosphate; and it comprises a method of making disodium phosphate from calcium phosphate wherein the phosphoric acid of calcium phosphate is converted into monosodium phosphate in solution, the monosodium phosphate is crystallized, the crystals dissolved and the solution neutralized to form disodium phosphate; and, more specifically, it comprises a method wherein an acid liquor is made from calcium phosphate with the aid of sulfuric acid, said liquor containing $P_2O_5$ partly as free phosphoric acid and partly as acid calcium phosphate, usually in about a 3:1 ratio, mother liquor from a succeeding operation is added, calcium sulfate is precipitated with the aid of sodium sulfate, there being often a preliminary purifying precipitation to aid in obtaining merchantable calcium sulfate, free phosphoric acid is neutralized to monosodium phosphate, insoluble phosphates formed thereby are removed and set aside for recovery of contained $P_2O_5$, pure monosodium phosphate is recovered as successive crops of crystals from the clarified liquor resulting from removal of insoluble phosphates, final mother liquor from the crystallization being sent back in process, the crystallized monosodium phosphate is dissolved and neutralized to form a concentrated solution of disodium phosphate from which crystals of the latter can be, and are, obtained on cooling; neutralization occasionally being to trisodium phosphate which is then crystallized in the same way; all as more fully hereinafter set forth and as claimed.

Crystallized disodium hydrogen phosphate, $Na_2HPO_4.12H_2O$, known commercially as "phosphate of soda", is a staple widely used material made on the large scale from natural calcium phosphate or rock phosphate. It is made, and sold as a clean crystallized product under rigid specifications as to purity and composition. Rock phosphate being an impure material, the production of pure phosphate of soda by a simple and economical method giving good yields of the crystallized salt without waste of material or labor is an important technical problem.

In the original method of making disodium phosphate in the factory, a method still in use, calcium phosphate is broken up with sulfuric acid, giving an insoluble body of calcium sulfate (gypsum) gangue, etc., and an impure acid solution containing $P_2O_5$ as free phosphoric acid. Generally the solution is treated with barium carbonate and filtered to free it of the sulfate ion. The filtrate is then neutralized with soda to convert the phosphoric acid into disodium phosphate. A precipitate of complex constitution forms, carrying down everything insoluble in a hot concentrated neutral or alkaline solution of disodium phosphate. The precipitate contans fluorin and phosphates of calcium, barium, iron, aluminum, magnesium, etc. Much, though not all, of the impurity present in the original acid solution comes out at this point, but so does much of the $P_2O_5$. The precipitate ("white mud") is recovered as a washed press cake and is sold as a low grade fertilizer or fertilizer filler. It carries 10 to 20 per cent of the original $P_2O_5$ of the rock phosphate, but in an insoluble and unavailable form. The filtrate from the press cake is boiled to aid in removing $CO_2$, dosed with enough NaOH to insure completion of the formation of disodium phosphate, cooled, and crystallized $Na_2HPO_4.12H_2O$ recovered. Residual impurities remain in the mother liquor.

Many improvements on this method have been proposed and used, but in principle they all contemplate directly neutralizing a phosphoric acid liquor obtained from a crude calcium phosphate to form a solution of disodium phosphate, separating the precipitate formed by the neutralization and crystallizing disodium phosphate from the impure neutral or alkaline liquid resulting. The actual factory processes in use are often quite complex, involving many filtrations and much recycling of materials, but in all, disodium phosphate is delivered as crystals separated from a more or less impure mother liquor.

In and of itself crystallization of $$Na_2HPO_4.12H_2O$$

to obtain good crops of clean crystals is not altogether simple. The salt carries 60 per cent water of crystallization and small variations in water content of a saline liquor cause great differences in yield in making a crop of crystals. The saline liquor must be cooled below 95–115° F. to produce crystals and cooling is slow, crystallization being exothermic. The specific gravity of the crystals is not much above that of the mother liquor in which they are formed and settling is not ready.

The presence of any impurity in the mother liquor complicates the operation considerably. The presence of sodium sulfate in the mother liquor is considered particularly objectionable; this being the reason for the removal of the sulfate ion from the acid liquor with the aid of barium carbonate in the usual process.

In the present invention production of disodium phosphate is postponed until purification is completed. Monosodium phosphate is made as an intermediate material in pure crystallized form leaving sodium sulfate in the mother liquor. The monosodium phosphate crystals are then dissolved and converted into disodium phosphate. The intermediate purification of monosodium phosphate by crystallization from the partly neutralized phosphoric acid solution permits separation of the sulfate ion in the form of precipitated calcium sulfate of great purity, with obviation of the use of barium compounds for removal of sulfates, with saving both of acid in the rock extraction and of soda in neutralization and with increase in both the yield and the purity of the sodium phosphate product.

In practicing my invention, fine ground native or rock phosphate is decomposed with dilute sulfuric acid to give an acid liquor. Advantageously the proportion of sulfuric acid is such that a major fraction of the $P_2O_5$ extracted goes into solution as free acid and a minor fraction as acid calcium phosphate. A ratio of 3:1 is desirable. This gives complete extraction of $P_2O_5$ and an economy in sulfuric acid. The reaction mixture is filter pressed and the cake of gangue and calcium sulfate is washed and discarded. With proper operation it contains only negligible amounts of $P_2O_5$. In the filtrate, the $P_2O_5$ is converted into monosodium phosphate by successive additions of sodium sulfate and sodium carbonate.

The added sodium sulfate reacts with the acid calcium phosphate, giving monosodium phosphate and a precipitate of calcium sulfate. To the extent that sodium sulfate can be used in this step it replaces sulfuric acid in treating the rock and carbonate of soda later used. Its use therefore produces an economy. After removal of the calcium sulfate the free phosphoric acid of the solution is converted into monosodium phosphate by an addition of sodium carbonate. This addition of sodium carbonate causes a precipitation of insoluble phosphates of iron, aluminum, etc. but the precipitate is of different character from that obtained in the usual process and is much more amenable to treatment for the recovery of $P_2O_5$. It is removed, washed and set aside for subsequent treatment. The liquid after the addition of the right amount of soda ash is neutral to methyl orange but acid to most other indicators.

The addition of sodium sulfate gives me a precipitate of $CaSO_4$ which is clean and white, having been formed in an acid solution. It often, however, contains sodium fluosilicate as an impurity. Where fluorin is present in the rock phosphate and it is desirable to market the $CaSO_4$ as a pigment, paper filler, etc., it is advisable to remove hydrofluosilicic acid from the acid liquor before making the $CaSO_4$. This can be done by a small addition to the original acid liquor of sodium carbonate which precipitates the difficultly soluble sodium fluosilicate by an addition of barium phosphate dissolved in phosphoric acid, which gives barium fluosilicate; or by a small preliminary addition of sodium sulfate, which gives a mixed precipitate containing sodium fluosilicate and a little calcium sulfate. After precipitation of the fluosilicate, pure calcium sulfate may be recovered in a marketable condition by the described addition of sodium sulfate. In this latter precipitation, no great nicety in the use of reagents is necessary since neither acid calcium phosphate nor sodium sulfate in excess in small amounts injures the subsequent operation of crystallizing monosodium phosphate and either lessens the solubility of calcium sulfate. The presence of a small excess of sodium sulfate gives a better precipitation of calcium sulfate and I generally have this excess.

Before precipitating the calcium sulfate, I generally add residual mother liquor from the crystallization of monosodium phosphate; and any excess of sodium sulfate or of acid calcium phosphate occurring in this liquor is thereby recycled.

The hot clear liquid resulting from the soda ash treatment and removal of the iron, etc, phosphate precipitate is next cooled and deposits a crop of crystals of monosodium phosphate. Crystals and mother liquor are separated and the latter reconcentrated to obtain a second crop. Generally, the second mother liquor is reconcentrated to obtain a third crop and the final mother liquor is sent back in process. The various crystal crops when properly washed are pure, the mother liquor made as described containing nothing interfering with their purity. The final mother liquor still contains monosodium phosphate and it may contain some acid calcium phosphate or some sodium sulfate which, in either event, goes back for reuse. While, as stated, sodium sulfate is objectionable in crystallizing disodium phosphate it is not in crystallizing monosodium phosphate. If chlorid occurs in the materials used, the chlorid concentration in successive mother liquors builds up and mother liquor must be taken out of the system from time to time.

For the purposes of crystallization, monosodium phosphate presents many advantages over disodium phosphate from a factory point of view. It is denser and settles better and it carries only 23 per cent water of crystallization as against the 60 per cent of $Na_2HPO_4.12H_2O$. Monosodium phosphate crystals are readily settled, washed and drained in a centrifugal, giving a pure product.

There is no particular difference in purity between the three crops of crystals of monosodium phosphate obtained as described and they are united and dissolved with addition of hot water. The solution is treated with sodium carbonate as long as free effervescence occurs and caustic soda is then added to complete the formation of disodium phosphate. If the amount of water is properly chosen, the hot solution on cooling gives a good crop of pure disodium phosphate crystals.

My primary purpose is that of manufacturing commercial "phosphate of soda" ($Na_2HPO_4.12H_2O$) as loose crystals of the usual size, weight and character; that being a staple and standard article of commerce. To this end I ordinarily make hot solutions of such concentration, say about 70 per cent water, that on cooling a good crop of crystals of marketable size and a mother liquor is produced. In so doing I have the incidental advantage that the mother liquor is, or may be, of such purity that washing the crystals is not necessary; the wet crystals may be directly dried. Because of this purity of liquid however I am enabled moreover to make certain articles of solid or massive phosphate which are commercially novel. A hot pure solution containing about 60 per cent of water has the same composition as the crystallized salt; it may be regarded as disodium phosphate in a molten condition. And it may be cast in molds and solidified as a whole to give blocks, balls or sticks of definite weight and composition. Pound and half-pound balls and sticks are convenient for storage, shipment and use and because of the less surface area are less affected by exposure to air than the usual loose crystal article.

The liquid also lends itself readily to the production of flakes containing 12 or less molecules of water.

If there is a demand for the heptahydrated phosphate $Na_2HPO_4.7H_2O$ or the dihydrated, $Na_2HPO_4.2H_2O$ either can be produced by modifying the crystallization operation. But, as stated, the dodecahydrated $Na_2HPO_4.12H_2O$ in loose crystals is a standard article in the market.

As stated, I contemplate producing solid phosphate in various forms but hot concentrated pure solutions of disodium phosphate produced as described are useful for other purposes. In the invention of another, such a hot liquid containing about 60 per cent water and capable of setting to a solid mass on cooling, is placed in a thermally insulated receiver or stock tank and stored, shipped and used as "liquid phosphate of soda".

My invention, as described above and also as illustrated in the following specific example, can be visualized with greater clarity by reference to the accompanying drawing which shows, in the form of a flow sheet, an advantageous embodiment thereof, wherein phosphate rock is treated by a series of successive operations with the ultimate production of $Na_2HPO_4.12H_2O$. The several successive operations are indicated in the flow sheet by appropriate legends.

In a particular operation embodying the present invention, in which native phosphate rock was converted into marketable crystals of disodium phosphate, a batch of fine-ground Florida phosphate rock carrying 35 per cent $P_2O_5$ and weighing 1000 pounds was treated with 900 pounds of 77 per cent $H_2SO_4$. This amount of acid was sufficient to neutralize the carbonates present and part but not all of the calcium of the calcium phosphate, giving an acid liquor containing free phosphoric acid with some acid calcium phosphate. The ratio of the $P_2O_5$ in the two forms in this instance was 3:1. The insoluble residue of gangue and $CaSO_4$ was filtered off, washed and sent out of the system. It contained only 1.5 per cent of $P_2O_5$; a negligible amount. The distribution of the $P_2O_5$ between free phosphoric acid and acid calcium phosphate, of course, can be varied. But with the usual grades of phosphate rock, I find it desirable to extract $P_2O_5$ as phosphoric acid and as acid calcium phosphate in ratios between 80:20 and 75:25.

The united filtrate and washings carried as hydrofluosilicic acid 2 per cent fluorin figured on the phosphoric acid and acid phosphate extracted. In this particular operation just enough soda ash was added to convert the acid into sodium fluosilicate or silicofluorid. The precipitate was filtered out. With the filtered acid liquor was mixed the final mother liquor recovered in crystallizing monosodium phosphate in a previous operation and sodium sulfate added; the amount being sufficient to precipitate most of the calcium as calcium sulfate. The mother liquor used contained some sodium sulfate for which allowance was made. The precipitated calcium sulfate was filtered off. It was of pure, clean, white, iron-free character and marketable.

The filtrate from the calcium sulfate carrying both monosodium phosphate and free phosphoric acid was treated with just sufficient soda ash to convert $H_3PO_4$ into monosodium phosphate; enough to make the liquid neutral to methyl orange. A phosphate precipitate formed containing iron oxid, alumina, and a minor quantity of fluorin etc. This was filtered off and washed. The press cake weighed 87 pounds on a dry basis and contained 35 pounds of $P_2O_5$; an amount corresponding to 10 per cent of the $P_2O_5$ entering the system. The cake was digested with 50 per cent NaOH solution at about 80° C. This solution after digestion contained trisodium phosphate, etc. The digested and washed cake contained 3.5 pounds of residual $P_2O_5$; say 1 per cent of the $P_2O_5$ entering the system.

Returning to the monosodium phosphate solution filtered from the iron phosphate press cake, this was substantially pure, as stated, a little monosodium sulfate being about the only foreign matter. I concentrated the liquid by heat until a sample on cooling gave a copious crystallization of monosodium phosphate. Evaporation was in an ordinary vacuum evaporator, the finishing temperature being about 150° F. and the density about 52° B. This liquid contained about 46 per cent $NaH_2PO_4$. The hot liquor was cooled and a crop of crystals removed. The mother liquor was again concentrated and the hot liquid cooled to give a second crop of crystals. Another concentration gave a third crop of crystals and a final mother liquor enriched in sodium sulfate. This final mother liquor went back as described. The crystals of the three crops were washed a little; the washings being united with the final mother liquor. A hot solution was then prepared from the monosodium phosphate crystals. Wet monosodium phosphate crystals were melted in their water of crystallization by heating to temperatures between 125° and 200° F. giving a liquid of approximately 60° Bé., composed of approximately 93 per cent $NaH_2PO_4$ $2H_2O$ and about 7 per cent $H_2O$ as free water. A saturated solution of soda ash ($Na_2CO_3$) diluted with a little water, was added to the hot solution as long as vigorous evolution of CO occurred. At this point the solution contained about 5 per cent of unreacted $Na_2CO_3$. The solution was then agitated and heated until free $CO_2$ was driven off. The solution was then about 42° B. and contained approximately 90 to 95 per cent of $Na_2HPO_4.12H_2O$ and 5 to 10 per cent residual $NaH_2PO_4$. Sufficient NaOH was added to the hot solution to finish the conversion of $NaH_2PO_4$ into $Na_2HPO_4$. I sometimes use trisodium phosphate in finishing, replacing all or part of the NaOH. The hot solution of disodium phosphate thus prepared was diluted with a small amount of water and then filtered and decolorized. Commercial decolorizing carbon was used. The hot solution contained approximately 70 per cent of water. It was cooled with stirring to produce a crystal crop and the crystals separated from the mother liquor. This mother liquor was used to dilute the next batch of disodium phosphate solution. The $Na_2HPO_4.12H_2O$ was bagged for the market. The size of the crystals or grains was commercially satisfactory.

The washed white mud press cake of insoluble matters formed in converting acid calcium phosphate and free phosphoric acid into monosodium phosphate was digested with caustic soda solution. This brought most of the $P_2O_5$ and the alumina in solution, leaving a residue which was mostly iron oxid carrying a small and negligible amount of $P_2O_5$. The hot solution formed in digestion was diluted with enough water to furnish water of crystallization for Na₃PO₄.12H₂O and cooled. This gave a crop of crystallized trisodium phosphate. This trisodium phosphate was directly marketed. The mother liquor from the trisodium phosphate was used to furnish another crop of crystals. The final mother liquor contained a negligible amount of P₂O₅ and a form of sodium aluminate which for some reasons has particular properties making it marketable as a water purifying preparation. It was utilized as such.

What I claim is:

1. In the manufacture of sodium phosphates from native calcium phosphates, the process which comprises producing an acid liquor containing free phosphoric acid from such native phosphate, neutralizing the acid with enough soda to form a monosodium phosphate solution, separating insoluble phosphates of iron and aluminum thereby produced, crystallizing out monosodium phosphate with separation of a mother liquor, returning the mother liquor to a succeeding acid liquor, purifying, redissolving and neutralizing the separated monosodium phosphate to form a non-acid sodium phosphate in solution and crystallizing the non-acid phosphate to obtain a solid marketable product.

2. The process of claim 1 in which the non-acid sodium phosphate is disodium hydrogen phosphate.

3. The process of claim 1 in which the non-acid sodium phosphate is trisodium phosphate.

4. The process of claim 1 wherein the acid liquor contains acid calcium phosphate as well as free phosphoric acid and the calcium is separated as calcium sulfate by an addition of sodium sulfate prior to neutralizing to monosodium phosphate.

5. In the manufacture of disodium phosphate the process which comprises preparing a liquor containing phosphoric acid and acid calcium phosphate with the aid of sulfuric acid, purifying said liquor and converting both the phosphoric acid and the acid calcium phosphate into monosodium phosphate, filtering the liquid, crystallizing monosodium phosphate from the liquid in purified form, redissolving the crystals and neutralizing a hot solution thereof to form disodium phosphate.

6. In the manufacture of disodium phosphate the process which comprises preparing a liquor containing phosphoric acid from calcium phosphate with the aid of sulfuric acid, purifying said liquor and converting the phosphoric acid into monosodium phosphate, filtering the liquid, crystallizing monosodium phosphate from the liquid in purified form with separation of a mother liquor, redissolving the crystals, neutralizing a hot solution thereof to form disodium phosphate and cooling the solution to form crystals of a hydrated disodium phosphate.

7. In the manufacture of disodium phosphate the process which comprises preparing a liquor containing phosphoric acid from calcium phosphate with the aid of sulfuric acid, purifying said liquor and converting the phosphoric acid into monosodium phosphate, filtering the liquid, crystallizing monosodium phosphate from the liquid in pure form with separation of a mother liquor, redissolving the crystals, neutralizing a hot solution thereof to form disodium phosphate and cooling the solution to form crystals of Na₂HPO₄.12H₂O.

8. In the manufacture of commercial sodium phosphates from calcium phosphate material the process which comprises treating such a calcium phosphate material with enough sulfuric acid to produce some free phosphoric acid and some acid calcium phosphate in solution, precipitating contained fluosilicic acid as an insoluble salt, separating calcium sulfate as a precipitate by an addition of sodium sulfate, converting free phosphoric acid into monosodium phosphate by neutralizing with soda, separating the precipitate, concentrating the solution and crystallizing out monosodium phosphate, separating mother liquor, redissolving the crystals, neutralizing the solution and crystallizing out a pure non-acid phosphate as pure crystals of a hydrated salt.

9. In the process of claim 8, removing fluosilicic acid as a barium salt.

10. In the process of claim 8, removing fluosilicic acid as a sodium salt.

11. In the process of claim 8, removing fluosilicic acid as an insoluble sodium salt admixed with some calcium sulfate by a small addition of sodium sulfate prior to the main addition of sodium sulfate.

12. In the manufacture of pure commercial crystallized disodium and trisodium phosphates from acid liquors produced by treating calcium phosphate with sulfuric acid the process which comprises converting the P₂O₅ of such a liquor into monosodium phosphate, separating precipitates formed in conversion, crystallizing monosodium phosphate and removing mother liquor with contained sulfates, returning the mother liquor to a succeeding acid liquor, redissolving the monosodium phosphate, alkalizing to form a pure solution of a non-acid sodium phosphate, and crystallizing out such non-acid phosphate.

13. In the manufacture of commercial "phosphate of soda" containing disodium phosphate crystallized with about 60 per cent water of crystallization, the process which comprises preparing a purified solution of monosodium phosphate from raw calcium phosphate, crystallizing the monosodium phosphate with separation of impurities in a mother liquor to give a pure crystallized product, redissolving the crystals to form a hot pure solution, neutralizing the hot solution with sodium carbonate and with sodium hydrate to produce a pure hot solution of disodium phosphate and recovering from said solution crystallized solid dodecahydrated disodium phosphate carrying about 60 per cent water of crystallization as a commercial product.

14. In the method of claim 13, producing a loose crystalline mass of Na₂HPO₄.12H₂O by forming a hot solution of disodium phosphate carrying more than 60 per cent by weight of water in the solution, cooling said solution with deposition of crystals and formation of a mother liquor, separating the crystals from the mother liquor and drying the crystals.

15. In the method of claim 13, forming a hot solution of disodium phosphate containing about 60 per cent water and cooling said solution to solidify it as a whole to a solid mass having a composition approximating Na₂HPO₄.12H₂O.

16. In the method of claim 5, forming from monosodium phosphate a hot disodium phosphate solution containing about 60 per cent by weight of water and thereby producing as a commercial product a liquid having a composition approximating Na₂HPO₄.12H₂O.

17. In manufacturing commercial sodium phosphate from native calcium phosphate, a process which comprises extracting the native phosphate with sulfuric acid so as to produce a liquid extract containing a major part of the P₂O₅ of the native phosphate as free phosphoric acid and a minor part as monocalcium phosphate, adding sodium sulfate to said liquor to precipitate calcium sulfate and to form monosodium phosphate in solution, separating iron and alumina as insoluble phosphates from the liquor by neutralizing the free phosphoric acid therein to monosodium phosphate, crystallizing out monosodium phosphate with separation of mother liquor, returning the mother liquor to a subsequent sulfuric acid phosphate extract, redissolving the crystallized monosodium phosphate and neutralizing it with soda to obtain a marketable phosphate of soda.

18. In the manufacture of sodium phosphates from natural calcium phosphates, a process which comprises preparing a phosphoric acid liquor by extracting the natural phosphate with sulfuric acid, precipitating residual calcium from the liquor as sulfate, precipitating iron and alumina as insoluble phosphates from said acid liquor by neutralizing the phosphoric acid therein to monosodium phosphate, separating the liquor from said precipitated phosphates, crystallizing out monosodium phosphate from the liquor and recycling the mother liquor from said crystallization to the calcium removing operation.

JOHN HARRY COLEMAN.